Figure 1:
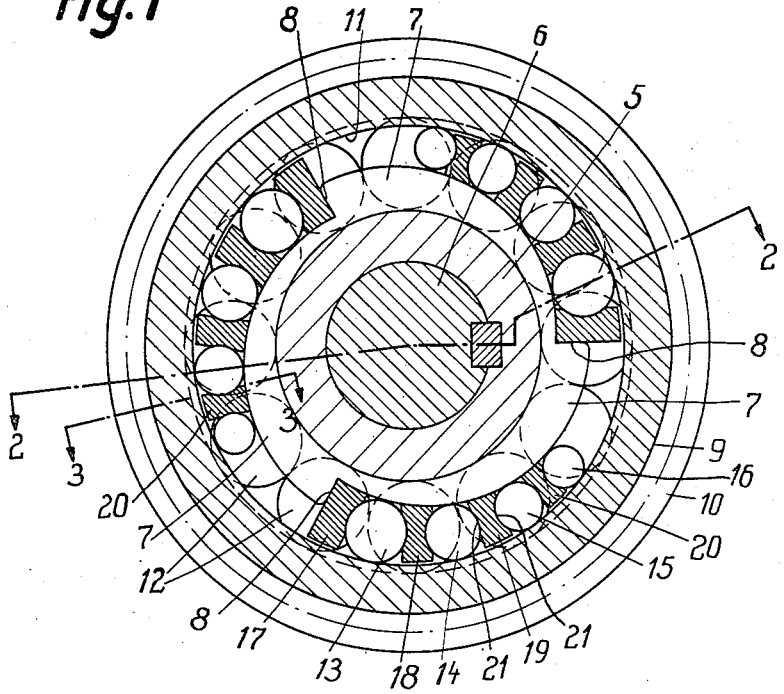

Sept. 24, 1940.   F. KREIS   2,215,615
FREEWHEELING UNIT
Filed Aug. 26, 1939

Inventor:
Friedrich Kreis,
By Potter, Pierce & Scheffler,
Attorneys.

Patented Sept. 24, 1940

2,215,615

UNITED STATES PATENT OFFICE 2,215,615

FREEWHEELING UNIT

Friedrich Kreis, Berlin-Lichterfelde, Germany, assignor to Gesellschaft zur Konstruction und Verwertung Automatisch-Mechanischer Getriebe m. b. H., Berlin-Oberschoneweide, Germany Application August 26, 1939, Serial No. 292,147
In Germany October 27, 1938

3 Claims. (Cl. 192—45)

The present invention relates to freewheeling units including drive and driven members one of which is provided with a plurality of cam surfaces and a plurality of groups of clutching rollers movable into interengaging relation with the drive and driven elements, the rollers of each group progressively diminishing in size with the increase in height of the cam surfaces of one of said members.

In prior devices of this general type attempts have been made to insure uniform clutching engagement of all of the rollers of each group by use of springs which normally urge the rollers toward the locking position in one direction or by providing cages for the rollers to achieve uniform action or simultaneous movement thereof.

Such constructions necessitated very accurate construction and mounting of the parts and after the parts became worn in use, the accurate relation of the parts no longer obtained and uniform clamping of the rollers was no longer obtained. Under these conditions only a portion of the rollers came into clutching engagement so that the stresses of the driving forces between the drive and driven members was not uniformly distributed over the normal clutching surfaces as desired for proper operation.

The use of comparatively strong springs employed to bias the rollers toward clutching position resulted in excessive wear on the parts due to the constant pressure on the relatively moving contacting surfaces.

It is an object of the invention to provide a freewheeling clutch unit in which the disadvantages of the previous types are overcome and in which uniform clutching engagement of all of the roller members is insured when the drive and driven members are locked in driving relation through the rollers.

Another object of the invention is to provide a freewheeling clutch unit comprising drive and driven members with interposed roller clutching elements in which independent centrifugally acting roller separating blocks capable of limited movement in a radial direction are provided between the rollers and between the end roller of each group and a shoulder on one of the members for the purpose of positively moving the rollers into clutching engagement between the members.

Another object of the invention is to provide a freewheeling clutch unit comprising drive and driven members with interposed roller clutching elements capable of one-way driving engagement in combination with centrifugally acting roller separating blocks of progressively diminishing size and weight and formed with roller seating channels in the roller contacting faces thereof said channels corresponding in shape to the contour of the respective roller surfaces with which they engage.

Figure 2:
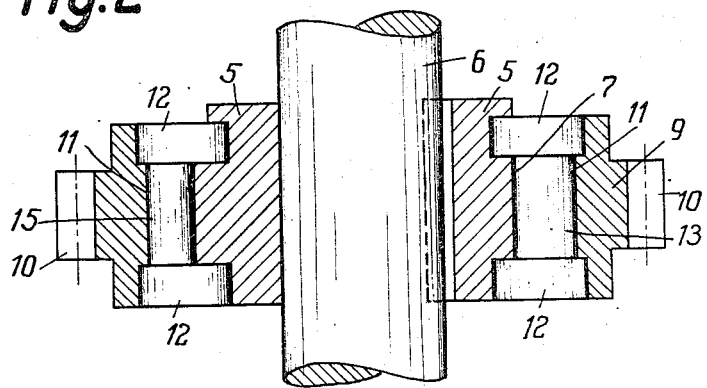
Figure 3:
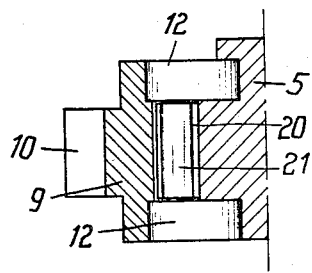

Other objects and advantages of the invention will be apparent from the following detailed description of the invention in connection with the accompanying drawing which illustrates by way of example a constructional embodiment of the invention and wherein, Fig. 1 is a central section taken at right angles to the axis through a freewheeling unit embodying the invention, Fig. 2 is an axial section on the line 2—2 of Fig. 1, and Fig. 3 is a partial axial section on the line 3—3 of Fig. 1.

Referring more particularly to the drawing, wherein only so much of the related mechanism necessary to an understanding of the invention has been shown, the drive and driven members of the freewheeling unit comprises an inner roller supporting member 5 keyed on a shaft 6 and provided with three symmetrically arranged roller clamping cam tracks 7. The cam portions 7 each terminate at the high end in a shoulder 8 which forms an abutment at the low end of an adjacent cam surface.

The outer member 9 of the unit consists of a concentric ring or tubular member provided on its outer circumferential surface with gear teeth 10 for engagement with related parts, not shown, of the driving or driven mechanism. The ring 9 is provided with a smooth inner circumferential roller track 11 coaxial with the shaft 6.

The drive and driven members are mutually supported in coaxial relation for relative rotative movement by running rollers 12 which run in concentric tracks formed in the drive and driven members at each side of the clutching roller tracks.

The rollers for clutching and unclutching the members 5 and 9 are disposed in groups between the cam surfaces 7 and the circular roller track 11. There are four rollers, 13, 14, 15 and 16 in each group in the present embodiment. The rollers in each group progressively decrease in diameter, the rollers 13 being the largest since they are disposed at the low end or starting point of the cam tracks and the rollers 16 being the smallest. The relative size of the rollers is governed by the pitch of the cam track surfaces, as will be understood.

Separating blocks 17, 18, 19 and 20 substantially coextensive in length with the rollers 13 to 16 are disposed between each of the rollers of each group and between the largest roller of each group and the adjacent shoulder 8 of the next cam surface. These blocks, which are preferably formed of bronze, are provided on the roller engaging faces thereof with longitudinal channels or recesses 21 which have the same curvature as the respective rollers which engage the same. The separating blocks 17 to 20 progressively diminish in size and weight in the same direction as do the rollers of each group. The separating blocks are formed with a radial dimension less than the distance between the cam track 7 and the cooperating roller track 11 in the area in which they are disposed so as to be capable of limited radial movement as will be presently described. So long as the blocks are formed to provide sufficient play and are of progressively diminishing weight, accurate initial fitting thereof is not essential as this will occur after a few hours use of the unit in actual operation.

In the operation of the freewheeling unit constructed as described herein, when the relative speeds of rotation of the drive and driven members is such that the rollers are caused to ride up on the cam surfaces 7 into clutching position to lock the members 5 and 9 in driving relation, the blocks 17 to 20 exert centrifugal forces diminishing in relation to each other in the same degree as the relative weights of the respective blocks. The centrifugal force tending to throw the blocks outwardly with respect to the associated rollers produces a thrust on the rollers in the circumferential direction due to the displacement of the recesses 21 causing the rollers to ride out of the same. In this manner, the outward radial movement of blocks 20 exerts a circumferential thrust on the rollers 16 in each case which throws the latter positively into position to effect clutching driving engagement between the parts 5 and 9. In the same way, the blocks 19 throw the rollers 15 into clutching position, which action may follow that of the blocks 20, the same action occurring between each block and its associated roller in each group.

When the relative speed of rotation of the members 5 and 9 is such that the clutch is free running, it has been found that wear on the parts is negligible so that the unit is exceptionally long-lived and trouble-free.

While a preferred embodiment of the invention has been shown and described by way of illustration, it will be understood that various modifications and alterations in the details of construction may be resorted to without departing from the spirit of the invention within the scope of the appended claims.

I claim:

1. In a unit of the character described, a driving member and a driven member, a plurality of sets of roller clutching elements movable into interengaging positions when the driving member rotates faster than the driven member, the roller clutching elements in each group progressively diminishing in size, and centrifugally acting separating blocks between the respective roller elements of each group, said blocks progressively diminishing in size and weight in the same sense as said rollers and having roller seating channels in the roller contacting faces thereof.

2. In a freewheeling unit of the character described, coaxial drive and driven members, one of said members having a plurality of cam tracks and a shoulder at the low end of each of said cam tracks, the other member having a roller track in spaced cooperative relation with said cam tracks, a group of clutching rollers between each cam track and the associated roller track, said rollers in each group progressively decreasing in diameter with increase in the height of said cam tracks, and separating blocks between adjacent rollers of each group and between the end roller of each group and the adjacent shoulders aforesaid, said separating blocks being capable of radial movement with respect to said rollers and each being provided with an elongated roller seating recess in the roller contacting faces thereof, said blocks decreasing progressively in weight in the same direction as the decrease in size of said rollers in each group.

3. In a freewheeling unit of the character described, coaxial drive and driven members, one of said members having a plurality of symmetrically arranged circumferentially ascending cam tracks and a shoulder at the low end of each of said cam tracks, the other member having a cylindrical roller track in spaced cooperative relation with said cam tracks, a group of clutching rollers between each cam track and the associated roller track, the rollers of each group progressively decreasing in diameter in the direction of ascendancy of said cam tracks, and independently movable separating blocks between adjacent rollers of each group and between the end roller of each group and the adjacent shoulder aforesaid, said separating blocks being dimensioned for radial movement with respect to said rollers and each having a roller seating recess in the roller contacting faces thereof, said recesses conforming to the surface contour of the respective rollers, the separating blocks of each group decreasing progressively in weight in the same direction as the decrease in size of said rollers in each group.

FRIEDRICH KREIS.